Dec. 15, 1964   A. IRMISCH   3,161,783
PULSE-CURRENT GENERATOR
Filed July 24, 1962                                2 Sheets-Sheet 1

INVENTOR
ARNDT IRMISCH

BY
ATTORNEY

United States Patent Office 3,161,783
Patented Dec. 15, 1964

3,161,783
PULSE-CURRENT GENERATOR
Arndt Irmisch, Stuttgart-Zuffenhausen, Germany, assignor to International Standard Electric Corporation, New York, N.Y., a corporation of Delaware
Filed July 24, 1962, Ser. No. 212,076
Claims priority, application Germany, July 27, 1961
St 18,127
5 Claims. (Cl. 307—106)

The present invention relates to a pulse-current generator for supplying approximately rectangular pulses to an inductive load, wherein the leading edge pulse rise time, is supposed to be short, and the pulse amplitude is supposed to be exactly defined in dependence upon a given regulating quantity.

Generators for supplying constant current pulses, are well known. Thus, for example, one circuit arrangement is known in which the pulse amplitude is limited by a square-loop magnetic core premagnetized into the saturation area. This premagnitization is determined by an exactly defined current flowing in the premagnetizing winding. As soon as the current, upon switching-on, has reached a predetermined amplitude in the load circuit, the magnetic core is controlled into the linear area, hence into the area of high permeability, where the current, by virtue of the corresponding increase in the series impedance, is limited to a predetermined value.

This method, however, has a very unfavourable ratio of delivered useful output to the output consumed in the generator, in particular because the required steep leading edges necessitate a high driving voltage.

It is the object of the present invention to avoid the aforementioned disadvantages. In spite of the high cut-off rate, apparatus according to the subject invention is more efficient. The general idea of the invention is to apply a variable driving voltage to the load via an electronic switch, with the load arranged in series with the first winding of a known magnetic core-type current limiter. The magnetic core, having an approximately rectangular hysteresis loop, is premagnetized, via a second winding carrying a current of regulated magnitude, up to a certain point lying far within the saturation region.

The variable driving voltage is derived from a capacitor which is connected on one hand, via a series resistor, to a first source of direct voltage and, on the other hand, via a diode polarized in the backward direction, to a second source of lower direct voltage.

The recovery time of the pulse-current generator can be reduced by having the capacitor momentarily connected to the first source of direct voltage, prior to the tripping of the generator via a second electronic switch, in lieu of a constant series resistor connection.

The capacitors of several such pulse-current generators may be charged via a common electronic switch. In this case the individual charging leads of the capacitors must be isolated by appropriately placed diodes.

Only by means of a variable driving voltage acting through a magnetic core-type current limiter, providing current limitation in an uncritical way, is it possible to achieve steep leading edges of the rectangular pulses without overshoot, and without critical selection of component values. Normally, a transient curve without overshoot requires critical calculation and selection of component values.

In the following the invention will be explained in detail with reference to the embodiment shown in FIGS. 1–4 of the accompanying drawings, in which.

Figure 1:
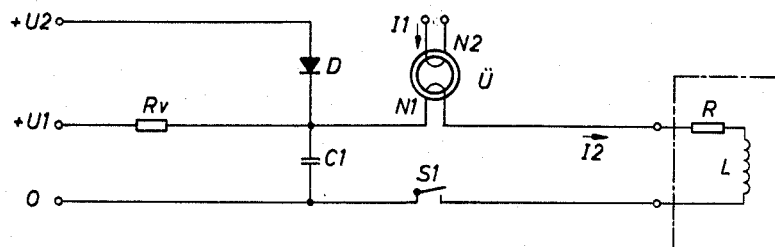
FIG. 1 shows the pulse-current generator according to the invention.
Figure 4A:
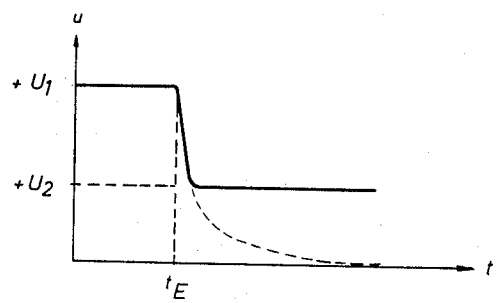
FIGS. 4a and 4b show the pulse waveforms as appearing during the "tripping" of the pulse-current generator.
Figure 4B:
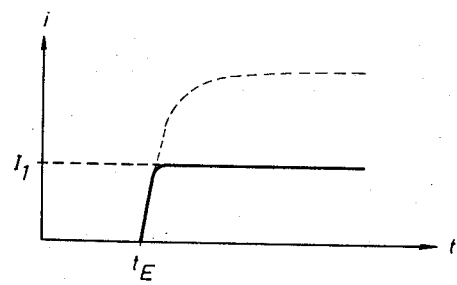

The mode of operation of the inventive type of pulse-current generator will now be described in detail with reference to FIGS. 1 and 4a and 4b of the accompanying drawings.

The electronic switch $S_1$ is assumed to be blocked. Prior thereto the capacitor $C_1$ has been charged to the value of the voltage $+U_1$ via the resistor $R_v$. The diode D is blocked because the voltage $+U_2$ is lower than $+U_1$.

If now the switch $S_1$ is closed at the time position $t_E$, then the voltage $+U_1$ applied to the capacitor $C_1$ will drive a current, via the winding $N_1$ of the core Ü, through the inductive load L+R. The core Ü which consists of a material having an approximately rectangular hysteresis loop, is retained by the regulated direct current $I_1$ in a defined state of saturation; accordingly, the winding $N_1$ only represents a slight series resistance.

On account of this load current $I_2$ the capacitor $C_1$ is discharged, and the driving voltage drops from $+U_1$ to $+U_2$ (FIG. 4a) because $R_v$ is relatively high-ohmic. The capacitor $C_1$ is so dimensioned that the energy stored therein is greater, approximately by the factor 2, than the energy which is necessary for producing the desired current $I_2$ in the inductance L of the inductive load, as well as for compensating the ohmic losses.

Subsequently to the switching-on, the current $i$ in the load L+R takes a steep rise and, in the case of a constant voltage $+U_1$, would follow the curve of the current as indicated by the dashline in FIG. 4b. However, since the core Ü is re-magnetized upon reaching the value of $I_1$, the current $i$ is limited to this value; there is not caused an overshoot. The winding $N_1$ of the core Ü, which is arrange in series with the load circuit, thus takes care of the load current $I_2$ assuming an exactly defined value. As soon as the current exceeds a predetermined value, the magnetic core is controllable from the range of saturation into the linear range, and the increase of the permeability immediately causes a high impedance to be inserted in the load circuit; this has a limiting effect upon the current.

The load current $I_2$ is taken over by the second source of direct voltage $+U_2$ as soon as the capacitor voltage breaks down to a value lying below the value of the voltage $+U_2$ (see FIG. 4a), because then the diode D is connected through. For this reason the voltage of this second source of voltage $+U_2$ is dimensioned somewhat higher than is actually necessary for maintaining the current $I_2$ throughout the entire circuit. For this reason the pulse-current generator only consumes a slight power loss.

Figure 2:
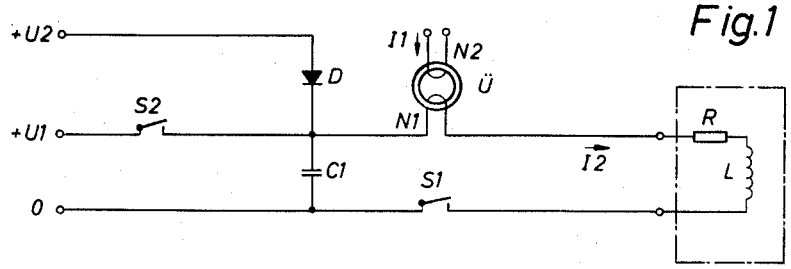
FIG. 2 shows a further embodiment of the subject matter of the invention.

FIG. 2 shows how the recovery time of the pulse-current generator can be reduced in that the series resistor $R_v$ is replaced by an electronic switch $S_2$.

The capacitor $C_1$ is connected for a short time to the source of voltage $+U_1$ prior to the tripping of the generator via the switch $S_2$, and is thus charged to the voltage value $+U_1$ quicker than would be possible via a series resistor. However, the electronic switch $S_2$ must be switched-off again before the switch $S_1$ is switched-on.

Figure 3:
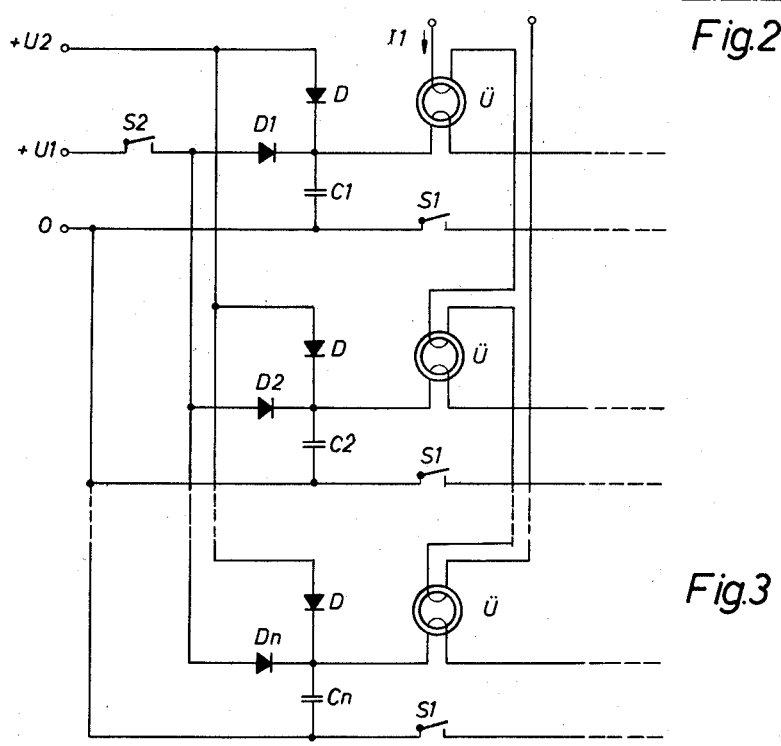
FIG. 3 shows the connecting-together of several pulse-current generators.

Several such generators may be connected to the source of voltage via a common switch $S_2$ (FIG. 3). In this case the individual conductors leading to the capacitors $C_1 \ldots C_n$ are preceded by the diodes $D_1 \ldots D_n$ for the decoupling purpose.

While I have described above the principles of my invention in connection with specific apparatus, it is to be clearly understood that this description is made only by

What is claimed is:

1. A pulse current generator for producing rectangular pulses, across an inductive load, each pulse leading edge having a short rise time and small transient overshoot, comprising an inductive load circuit, a magnetic core having an approximately rectangular hysteresis loop characteristic, a first winding on said core in series with said load circuit, a source of bias current, a second winding on said core connected to said bias current source, said bias current drawing said core far into its region of magnetic saturation, and means connected across said load circuit and series first winding for producing a pulse of current in opposition to said bias current, said pulse initially rising rapidly to a high level and then dropping at a predetermined rate to a lower holding level.

2. A pulse current generator according to claim 1 wherein said pulse producing means includes a capacitor having one end thereof connected to one end of the series circuit including said load circuit and said series first winding, and first current switching means connected between the other end of said capacitor and the other end of said series circuit.

3. A pulse current generator according to claim 2 wherein said pulse producing means further includes a current limiting resistor connected at one end thereof to said one end of said capacitor, a first source of direct voltage connected between the other end of said resistor and said other end of said capacitor, a first decoupling diode having one electrode thereof connected to said one end of said capacitor, said diode being poled to oppose the flow of current therethrough from said first source, and a second source of direct voltage lower than that of said first source connected between the other electrode of said diode and the other end of said capacitor.

4. A pulse current generator according to claim 2 wherein said pulse producing means further comprises a first source of direct voltage, second current switching means connected in series with said capacitor across said first source, a second source of direct voltage lower than said first source, and a decoupling diode, poled in opposition to current flow from said first source, connected in series with said capacitor across said second source.

5. A pulse current generator system comprising a plurality of magnetic cores having substantially rectangular hysteresis curves, a plurality of bias current windings inductively linked with said cores, a bias current source supplying D.C. bias current to all of said bias windings for conditioning said cores far into one of their regions of magnetic saturation, a plurality of inductive loads inductively lined with said cores, a plurality of first switches individually connected in series circuits with said loads, a plurality of capacitors individually connected across said series circuits consisting of said loads and said first switches, a first source of direct voltage, a common second switch, a plurality of first coupling diodes individually connected in series electrical circuits with said capacitors and said common switch across said first source, said diodes being poled to conduct charging current from said first source to said capacitors, a second source of direct voltage lower in magnitude than that of said first source, and a plurality of second coupling diodes individually connected in series electrical circuits with said capacitors across said second source, said second diodes being poled to conduct charging current from said second source to said capacitors while preventing any flow of current from said first source to said second source.

References Cited in the file of this patent

UNITED STATES PATENTS

| | | |
|---|---|---|
| 2,798,985 | Hansen | July 9, 1957 |
| 2,803,759 | Kreuder | Aug. 20, 1957 |
| 2,929,942 | Shepard | Mar. 22, 1960 |